3,300,530
PROCESS FOR PREPARING TRIS(N-ALKYL-ARYLAMINO)BORINES FROM N-ARYL AMIDES

Charles H. Mack and Samuel E. Ellzey, Jr., New Orleans, La., assignors to the United States of America as represented by the Secretary of Agriculture
No Drawing. Filed July 30, 1963, Ser. No. 298,794
5 Claims. (Cl. 260—551)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for the preparation of tris(N-alkyl-arylamino)borines. These compounds have also been named tris(N-alkyl-arylamino)boranes and N-alkyl-N-aryl boric acid tri-amides.

Tris(N-alkyl-arylamino)borines have been prepared by reacting boron trichloride with a large excess of an N-alkyl-arylamine or by reacting an N-alkyl-arylamine with a tris(alkylamino)borine (J. Chem. Soc., 1962, 4088). A more recent report involves the reaction of an N-alkyl-arylamine and boron trihalides in the presence of a Grignard reagent (German Patent 1,044,822 and British Patent 819,455).

The object of the present invention is to provide a process for the production of tris(N-alkyl-arylamino) borines of the type $(R_1R_2N)_3B$, in which $R_1$ represents an alkyl or aralkyl radical and $R_2$ represents an aryl radical, by the reaction of sodium borohydride with an N-aryl amide.

In general, the process of this invention comprises the intimate mixing of an excess of an alkali metal borohydride and an N-aryl amide in a nonaqueous inert solvent, at temperatures sufficient to bring about reaction. More specifically the process of this invention comprises the intimate mixing of from one to two moles of an alkali metal borohydride, such as sodium borohydride with one mole of an N-aryl amide in a solvent, such as the dimethyl ethers of diethylene glycol (diglyme) or triethylene glycol (triglyme) at temperatures from about 90° to about 220° C. or higher for from about five minutes to three hours.

The process of this invention is particularly useful for tailor-making special types of substituted aminoborines which may be difficult to obtain by other available methods. For example, tris(N-ethyl-p-hydroxyanilino) borine could be readily prepared from p-hydroxyacetanilide by this method while all other methods would produce polymers.

As will be seen from the examples, neither the presence of excess sodium borohydride nor increased reaction times will significantly increase the yields. However, the addition of about equimolar quantities of the corresponding N-alkylaniline to the reaction mixture will greatly increase the yield of the tris(N-alkylanilino)borine. As little as about one-half molar equivalent of the N-alkylaniline will greatly increase the yield of the borine. It is believed that by reacting an N-aryl amide, $ArNHCOR_2$, with sodium borohydride in the presence of an amine, $ArNHCH_2R_3$, in which $R_3$ is different from $R_2$, mixed tris(N-alkyl arylamino)borines will be obtained. Arylene diamides would most likely produce substituted aminoborine polymers.

It will also be seen from the examples that when the reaction temperature is increased, such as, by using triglyme (boiling point 222° C.) instead of diglyme (boiling point 161° C.), the reaction time must be decreased to a matter of minutes in order to obtain good yields of the borine. It is believed that competing reactions are occurring simultaneously, that is, the formation of the borine through a boron-containing complex and the reduction of the complex to the N-alkyl-arylamine. It is suspected that the addition of excess N-alkyl-arylamine to the reaction mixture suppresses the formation of amines and favors the formation of the borine.

Tris(N-alkyl-arylamino)borines of the type described in this invention are used in the plastics industry as stabilizers and as additives to fuels.

The following examples are given by way of illustration and should not be construed as limiting the scope of the invention.

EXAMPLE 1

A mixture of 6.76 g. (0.05 mole) of acetanilide, 2.08 g. (0.055 mole) of sodium borohydride and 50 ml. of diglyme was refluxed and stirred for one hour. During the reaction most of the sodium borohydride dissolved and the solution turned yellow. After cooling the solution it was poured into 300 ml. of ice and water. Careful acidification with 100 ml. of 20% acetic acid decomposed the excess hydride and the mixture was left in the refrigerator overnight. A 2.06 g. (329% yield) quantity of tris(N-ethylanilino)borine, M.P. 150–156° C., was filtered and washed well with water. Recrystallization from acetone gave the pure product, M.P. 168.5° C.

Analysis.—Calcd. for $C_{24}H_{30}BN_3$: C, 77.63; H, 8.14; N, 11.32. Found: C, 77.30; H, 8.13; N, 11.24.

After filtration of the aminoborine, the acidic filtrate of the original reaction mixture was treated with concentrated hydrochloric acid and ether-extracted. The water layer was made alkaline with sodium hydroxide and extracted with ether after saturating with sodium chloride. After washing the extract with sodium chloride solution and drying over sodium sulfate, the ether was evaporated and the residue analyzed by gas chromatography. In addition to traces of ether and a large amount of diglyme, the residue contained 0.27 g. (5.8% yield) of aniline and 0.91 g. (15% yield) of N-ethylaniline. In addition to the two amines the gas chromatogram indicated the presence of 0.36 g. (5.4% recovery) of unreacted acetanilide.

EXAMPLE 2

Experimental conditions were the same as in Example 1 except that the mixture was refluxed for two hours instead of one hour. The amount of tris(N-ethylanilino) borine recovered was 1.57 g. (25.1% yield). The yields of the amines were: aniline, 5.2%; N-ethylaniline, 22%. The acetanilide recovered amounted to 11%.

EXAMPLE 3

Experimental conditions were the same as in Example 1 except that twice the amount of sodium borohydride was used, 0.110 mole instead of 0.055 mole. The amount of tris(N-ethylanilino)borine recovered was 1.86 g. (30.0% yield). The remaining materials determined by gas chromatography were: aniline 7.0%, N-ethylaniline 11.4%, and acetanilide 11.6%.

EXAMPLE 4

Experimental conditions were the same as in Example 1 except that triglyme was used instead of diglyme. No tris(N-ethylanilino)borine was obtained but 2.40 g. (39.6% yield) of N-ethylaniline and 0.44 g. (6.4% yield) of acetanilide was recovered. No aniline was found.

EXAMPLE 5

Experimental conditions were the same as in Example 4 except that the solution was refluxed for eight minutes. After about this time the colorless mixture rapidly turns yellow in color. The reaction flask and contents were rapidly cooled by immediate immersion in ice water. The amount of tris(N-ethylanilino)borine recovered was 1.55 g. (25.2% yield). There was also obtained 1.43 g. (23.6% yield) of N-ethylaniline and 0.17 g. (3.6% yield) of aniline but no acetanilide was found.

EXAMPLE 6

Experimental conditions were the same as in Example 1 except that 6.06 g. (0.05 mole) of N-ethylaniline was refluxed with the reaction mixture. In this experiment the reaction mixture did not turn yellow. The amount of tris(N-ethylanilino)borine was 3.43 g. (55.1% yield). Remaining materials recovered were: aniline, 9.0%; N-ethylaniline, 82% of that added; and acetanilide, 16.8%.

EXAMPLE 7

Experimental conditions were the same as that in Example 6 except 12.12 g. (0.10 mole) of N-ethylaniline was used instead of 0.05 mole. The amount of tris (N-ethylanilino)borine was 3.30 g. (53.4% yield). There was also obtained 0.23 g. (5.0% yield) of aniline and 0.47% g. (7.0% yield) of acetanilide.

EXAMPLE 8

Experimental conditions were the same as in Example 6 except that 3.03 g. (0.025 mole) of N-ethylaniline was used instead of 0.05 mole. The amount of tris(N-ethylanilino)borine was 2.90 g. (46.7% yield). Other products found were 0.22 g. (4.8% yield) of aniline and 0.50 g. (7.4% yield) of acetanilide.

EXAMPLE 9

Experimental conditions were the same as in Example 6 except 3.38 g. (0.025 mole) of acetanilide was used instead of 0.05 mole. The amount of tris(N-ethylanilino)borine was 1.26 g. (40.8% yield). The remaining products as determined by gas chromatography were: aniline, 12.4%; N-ethylaniline, 80% of that added; and acetanilide, 20%.

EXAMPLE 10

A mixture of 12.12 g. (0.10 mole) of formanilide, 3.78 g. (0.10 mole) of sodium borohydride and 80 ml. of diglyme was refluxed for one hour. During the reaction most of the sodium borohydride dissolved and the solution turned yellow. After cooling the solution it was poured into 750 ml. of ice and water. Careful acidification with 100 ml. of 20% acetic acid decomposed the excess hydride and the mixture was left in the refrigerator overnight. Tris(N-methylanilino)borine was filtered off and washed well with water, 3.70 g. (33.6% yield). Sublimation of the crude aminoborine at 185° (ca. 0.001 mm.) gave the pure product, M.P. 214–216° C. The mixture melting point with an authentic sample showed no depression. Its infrared spectrum was identical with that of an authentic sample.

*Analysis.*—Calcd. for $C_{21}H_{24}BN_3$: C, 76.60; H, 7.35; N, 12.76. Found: C, 76.81; H, 7.41; N, 12.73.

After filtration of the aminoborine, the acidic filtrate of the original reaction mixture was treated with concentrated hydrochloric acid and ether-extracted. The water layer was made alkaline with sodium hydroxide and extracted with ether after saturating with salt. After washing the extract with salt solution and drying over sodium sulfate, the ether was evaporated and the residue analyzed by gas chromatography. In addition to traces of ether and a large amount of diglyme, the residue contained 1.41 g. (15% yield) of aniline, 2.30 g. (21.4% yield) N-methylaniline and 0.69 g. (5.7% recovery) of formanilide.

EXAMPLE 11

A mixture of 19.72 g. (0.10 mole) of benzanilide, 3.78 g. (0.10 mole) of sodium borohydride and 80 ml. of diglyme was refluxed for one hour during which time most of the sodium borohydride dissolved and the solution turned yellow. After cooling the reaction mixture it was poured into 300 ml. of ice and water. Careful acidification with 100 ml. of 20% acetic acid solution decomposed the excess sodium borohydride and the mixture was left in the refrigerator overnight. The mixture of solids, amounting to 15.2 g. after filtration and washing, was triturated with diethyl ether and filtered. Benzanilide amounting to 8.6 g. (43.7% recovery) was obtained. The ether from the above filtrate was removed by evaporation and the 6.6 g. of solids was triturated with cold methyl alcohol and filtered. Tris(N-benzylanilino)borine was obtained from the above filtration and amounted to 0.5 g. (2.6% yield). Recrystallization from commercial hexane gave the pure product, M.P. 200–201° C.

*Analysis.*—Calcd. for $C_{39}H_{36}BN_3$: C, 84.01; H, 6.51; N, 7.54. Found: C, 83.94; H, 6.57; N, 7.42.

Removal of the methanol from the above filtrate yielded 5.80 g. (31.7% yield) of N-benzylaniline, M.P. 37° C.

To the original acidic filtrate was added concentrated hydrochloric acid and after distillation with steam (approximately one liter of distillate) the residue was made alkaline with sodium hydroxide and extracted with ether after saturating with salt. After washing the extract with salt solution and drying over sodium sulfate, the ether was evaporated and the residue analyzed by gas chromatography. In addition to traces of ether and an unknown compound and a large amount of diglyme, the residue contained 0.95 g. (10.2% yield) of aniline.

We claim:

1. A process for the preparation of tris(N-alkyl-arylamino)borines of the formula $(R_1R_2N)_3B$, wherein $R_1$ is a radical selected from the group consisting of lower alkyl and benzyl and $R_2$ is a member selected from the group consisting of phenyl and hydroxy-substituted phenyl, which comprises reacting an N-arylamide of the formula

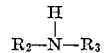

wherein $R_2$ has the same meaning as above and $R_3$ is the acyl moiety of an acid selected from the group consisting of a lower alkanoic acid and benzoic acid, with sodium borohydride in an anhydrous inert solvent at a temperature of from 90° to 220° C., the mole ratio of N-arylamide to sodium borohydride in the reaction mixture being about from 1:1 to 1:2, respectively.

2. The process of claim 1 wherein the tris(N-alkylarylamino)borine is tris(N-ethylanilino)borine, and the N-aryl amide is acetanilide.

3. The process of claim 1 wherein the tris(N-alkylarylamino)borine is tris(N-methylanilino)borine, and the N-aryl amide is formanilide.

4. The process of claim 1 wherein the tris(N-alkylarylamino)borine is tris(N-benzylanilino)borine, and the N-aryl amide is benzanilide.

5. A process for preparing tris(N-ethylanilino)borine which comprises reacting acetanilide with sodium borohydride at a temperature of about from 90° to 220° C. in an anhydrous inert solvent and in the presence of about from one-half to 2 moles of N-ethylaniline per mole of acetanilide, the mole ratio of acetanilide to sodium borohydride in the reaction mixture being about from 1:1 to 1:2, respectively.

References Cited by the Examiner

Davis, J. Chem. Soc. (1956), pp. 3981–82.

JOHN D. RANDOLPH, *Primary Examiner.*

WALTER A. MODANCE, *Examiner.*

HARRY I. MOATZ, *Assistant Examiner.*